(12) United States Patent
Koyanaka

(10) Patent No.: US 10,571,887 B2
(45) Date of Patent: Feb. 25, 2020

(54) NUMERICAL CONTROLLER

(71) Applicant: FANUC CORPORATION, Minamitsuru-gun, Yamanashi (JP)

(72) Inventor: Yousuke Koyanaka, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/833,015

(22) Filed: Dec. 6, 2017

(65) Prior Publication Data

US 2018/0164771 A1 Jun. 14, 2018

(30) Foreign Application Priority Data

Dec. 14, 2016 (JP) ................... 2016-242189

(51) Int. Cl.
*G05B 19/18* (2006.01)
*B23Q 17/22* (2006.01)
(Continued)

(52) U.S. Cl.
CPC ......... *G05B 19/182* (2013.01); *B23Q 3/1552* (2013.01); *B23Q 17/2208* (2013.01); *B23Q 2003/15586* (2013.01); *B23Q 2039/004* (2013.01); *B23Q 2220/002* (2013.01); *G05B 19/19* (2013.01); *G05B 2219/35349* (2013.01); *G05B 2219/50264* (2013.01)

(58) Field of Classification Search
CPC ........ B23Q 3/1552; B23Q 2003/15586; B23Q 2220/002; B23Q 17/2208; B23Q 2039/004; G05B 19/182; G05B 2219/50264; G05B 2219/35349
See application file for complete search history.

(56) References Cited

U.S. PATENT DOCUMENTS 4,651,601 A * 3/1987 Sasaki ................... B21D 28/12
700/178
6,157,869 A 12/2000 Matsumura et al.
(Continued)

FOREIGN PATENT DOCUMENTS

CN 101244517 A 8/2008
CN 101439410 A 5/2009
(Continued)

OTHER PUBLICATIONS

Decision to Grant a Patent for Chinese Application No. 201711338682.7, dated Jan. 25, 2019, with translation, 7 pages.
(Continued)

*Primary Examiner* — Jennifer L Norton
(74) *Attorney, Agent, or Firm* — RatnerPrestia

(57) ABSTRACT

A numerical controller performs control to rotate a turret, which holds a plurality of tools on the outer peripheral portion thereof, thereby moving one (selected tool) of the tools selected by a command to a predetermined position (selected position). The numerical controller sets and holds a partial area of the outer peripheral portion of the turret as an area (passage-prohibited area) prohibited from passing through the selected position and determines whether or not the selected tool is present in the passage-prohibited area or whether or not the passage-prohibited area passes through the selected position as the selected tool is moved to the selected position.

4 Claims, 13 Drawing Sheets

(51) Int. Cl.
  *B23Q 3/155* (2006.01)
  *G05B 19/19* (2006.01)
  *B23Q 39/00* (2006.01)

(56) References Cited

U.S. PATENT DOCUMENTS

| | | | |
|---|---|---|---|
| 7,501,779 B2* | 3/2009 | Seong | B23Q 16/025 318/571 |
| 9,815,158 B2* | 11/2017 | Isobe | B23Q 3/15706 |
| 9,904,273 B2 | 2/2018 | Ikegaya | |
| 9,969,040 B2* | 5/2018 | Nakazawa | B23Q 3/15713 |
| 2001/0012973 A1* | 8/2001 | Wehrli | B23Q 17/22 700/193 |
| 2007/0225139 A1* | 9/2007 | Kojima | B23Q 3/15706 483/1 |
| 2009/0133239 A1 | 5/2009 | Tanaka | |
| 2010/0242694 A1* | 9/2010 | Kitayama | B23B 3/10 82/121 |
| 2012/0239182 A1* | 9/2012 | Kikata | G05B 19/4061 700/186 |
| 2015/0068272 A1* | 3/2015 | Kasahara | G05B 19/4061 73/1.79 |
| 2015/0309501 A1 | 10/2015 | Ikegaya | |
| 2016/0187871 A1* | 6/2016 | Yi | B23Q 1/0045 700/173 |
| 2017/0072473 A1* | 3/2017 | Kawasumi | B23B 3/167 |
| 2017/0087678 A1* | 3/2017 | Isobe | B23Q 3/15706 |
| 2017/0113313 A1* | 4/2017 | Aoyagi | B23Q 5/10 |
| 2018/0117681 A1* | 5/2018 | Aoyagi | B23B 29/323 |
| 2019/0219984 A1* | 7/2019 | Mai | G05B 19/4061 |

FOREIGN PATENT DOCUMENTS

| | | |
|---|---|---|
| CN | 203292947 U | 11/2013 |
| CN | 104423322 A | 3/2015 |
| CN | 105045207 A | 11/2015 |
| EP | 0182917 A1 | 6/1986 |
| EP | 2846206 A1 | 3/2015 |
| JP | 58126046 A | 7/1983 |
| JP | S60247421 A | 12/1985 |
| JP | H06114679 A | 4/1994 |
| JP | H 07-251352 A | 10/1995 |
| JP | 2576423 B2 | 1/1997 |
| JP | 2006102923 A | 4/2006 |
| JP | 2011-237880 A | 11/2011 |
| JP | 2013065180 A | 4/2013 |
| JP | 2015210585 A | 11/2015 |

OTHER PUBLICATIONS

Decision to Grant a Patent for Japanese Application No. 2016-242189, dated May 1, 2018, with translation, 6 pages.

* cited by examiner

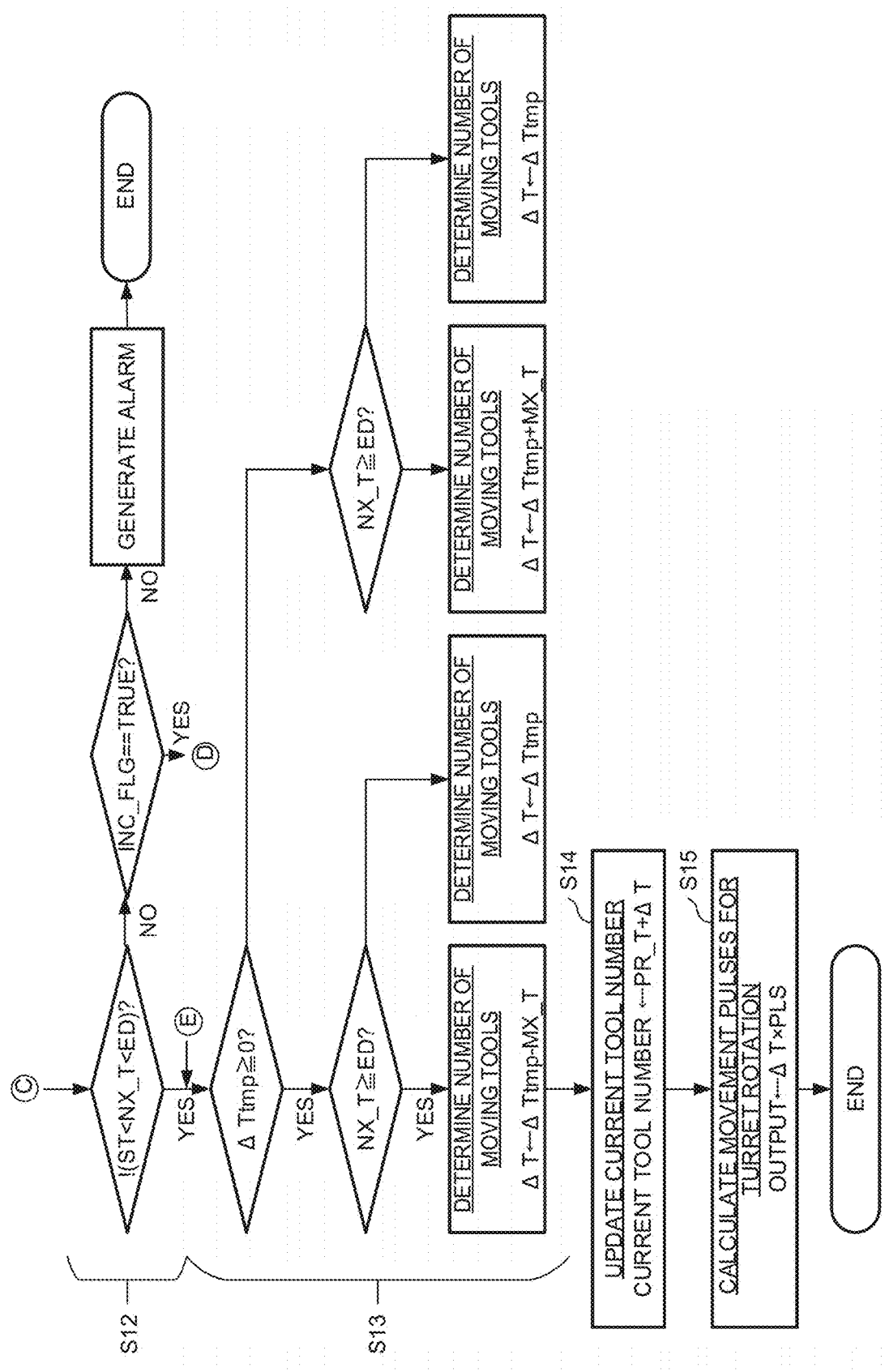

NUMERICAL CONTROLLER

CROSS-REFERENCE TO RELATED APPLICATIONS

This application is a new U.S. Patent Application that claims benefit of Japanese Patent Application No. 2016-242189, filed Dec. 14, 2016, the disclosure of this application is being incorporated herein by reference in its entirety for all purposes.

BACKGROUND OF THE INVENTION

Field of the Invention

The present invention relates to a numerical controller, and more particularly, to a numerical controller capable of avoiding interference with rotation of a tool changer turret.

Description of the Related Art

Some cutting machines are provided with a turret for holding a plurality of tools. When a numerical controller performs a tool change command, the turret rotates to change a tool for machining a workpiece.

FIG. 1 shows an example of the turret. In this example, eight types of tools, No. 1 to No. 8, can be mounted on a turret 10. In the state of FIG. 1, a workpiece 11 can be machined by using No. 1 tool t1 mounted on the turret 10. The tool in this state will hereinafter be referred to as "selected tool". Moreover, the position of the selected tool in this state will hereinafter be referred to as "selected position".

FIGS. 2 to 4 are views showing typical turret motions.

The turret 10 rotates in response to an absolute command, an incremental command, and a command based on a manual operation.

FIG. 2 shows an operation for selecting a tool of a specified number by taking a shortcut (absolute-command operation). For example, if No. 6 tool t6 is specified as a new selected tool with No. 1 tool t1 selected earlier, the numerical controller rotates the turret 10 in a shortcut direction, that is, in a forward or reverse direction whichever may be the rotation direction in which the specified tool can be reached earlier, thereby selecting No. 6 tool t6 as the selected tool.

FIG. 3 shows an operation for selecting a tool of a specified number by rotating the turret for a specified number of numbers in one predetermined direction (clockwise in the example of FIG. 3), forward or reverse (incremental-command operation).

FIG. 4 shows the operation of the turret 10 performed when a tool change button (not shown) of a cutting machine or the like is manually operated. In response to the button operation, the numerical controller rotates the turret 10 number by number in one predetermined direction, forward or reverse, thereby specifying, as the new selected tool, the tool (t2) of the number adjacent to the currently selected tool (t1).

In an absolute-command operation, the rotation direction of the turret 10 is restricted to one direction (shortcut direction) corresponding to the newly selected tool. In this case, a problem arises that a long tool (t2) cannot avoid interfering with a machine or some other structure 12 (hereinafter referred to as "machine") in the process of rotation of the turret 10 for tool change, as shown in FIG. 5. Moreover, there is a problem that a cable 13 of the cable-connected tool t1 such as an air spindle inevitably gets entangled, as shown in FIG. 6, if a plurality of revolutions in the same direction are made.

In an incremental-command operation or manual operation, in contrast, the above problems can be avoided by specifying the rotation direction for each command or operation. In order to perform this command, however, it is necessary to specify an optimal rotation method for each tool selection while previously ascertaining the tool position, thus entailing complicated operations.

To overcome this problem, Japanese Patent Application Laid-Open No. 2011-237880 discloses how to avoid interference between the machine 12 and the tools by retracting the turret 10 itself, as shown in FIG. 7. Moreover, Japanese Patent Application Laid-Open No. 7-251352 discloses a method in which an interference region 15 where the workpiece 11 can interfere with the machine 12 is previously set by using position information (coordinate values) in rotating a rotary table 14 that holds the workpiece 11 to be machined, as shown in FIG. 8. In determining the rotation direction, according to this method, the rotation direction is selected such that a target position can be reached quickly without the passage of the interference region. In FIG. 8, numeral 16 denotes a fixed table.

The technique described in Japanese Patent Application Laid-Open No. 2011-237880 (FIG. 7) has a problem, however, that it cannot be adopted without the use of a machine structure that can move the turret itself. Moreover, the technique described in Japanese Patent Application Laid-Open No. 7-251352 (FIG. 8) may also be applied to the turret. In this case, however, it is necessary for a rotation axis of the turret to manage the position information (coordinate values). If the turret is rotated by a motor such as a spindle motor that does not manage the position information (coordinate values), however, the rotation is controlled only based on the necessary number of pulses for rotation for each tool number that is held in advance and the control based on the position information is not easy. Furthermore, the technique of Japanese Patent Application Laid-Open No. 7-251352 does not disclose any control to be performed when a tool in the interference region is selected.

SUMMARY OF THE INVENTION

The present invention has been made to solve these problems and its object is to provide a numerical controller capable of avoiding interference with rotation of a tool changer turret.

A numerical controller according to the present invention rotates a turret, which holds a plurality of tools on the outer peripheral portion thereof, thereby moving a selected one of the tools selected by a command to a predetermined selected position. This numerical controller comprises a passage-prohibited area holding unit configured to hold a partial area of the outer peripheral portion of the turret as a passage-prohibited area prohibited from passing through the selected position and a passage-prohibited area check unit configured to determine whether or not the selected tool is present in the passage-prohibited area and/or whether or not the passage-prohibited area passes through the selected position as the selected tool is moved to the selected position.

The numerical controller can further comprise an alarm generating unit configured to generate an alarm if the selected tool is present in the passage-prohibited area.

The passage-prohibited area check unit may be configured to newly select the tool outside the passage-prohibited area if the selected tool is present in the passage-prohibited area, and the numerical controller may further comprise a turret rotation control unit configured to move the newly selected tool to the selected position.

The passage-prohibited area check unit may be configured to generate a new command for rotating the turret reversely relative to the direction responsive to the command for selection if the passage-prohibited area passes through the selected position as the selected tool is moved to the selected position, and the numerical controller may further comprise a turret rotation control unit configured to move the selected tool to the selected position in response to the new command.

The selected tool may be specified by a tool number or the number of tools to be moved.

The passage-prohibited area may be identified by a tool number.

According to the present invention, there can be provided a numerical controller capable of avoiding entanglement of a cable of a cable-connected tool due to interference with rotation of a tool changer turret, or the like.

BRIEF DESCRIPTION OF THE DRAWINGS

FIGS. 15A to 15E are flowcharts showing the operation of the numerical controller.

DETAILED DESCRIPTION OF THE PREFERRED EMBODIMENTS

Figure 1:
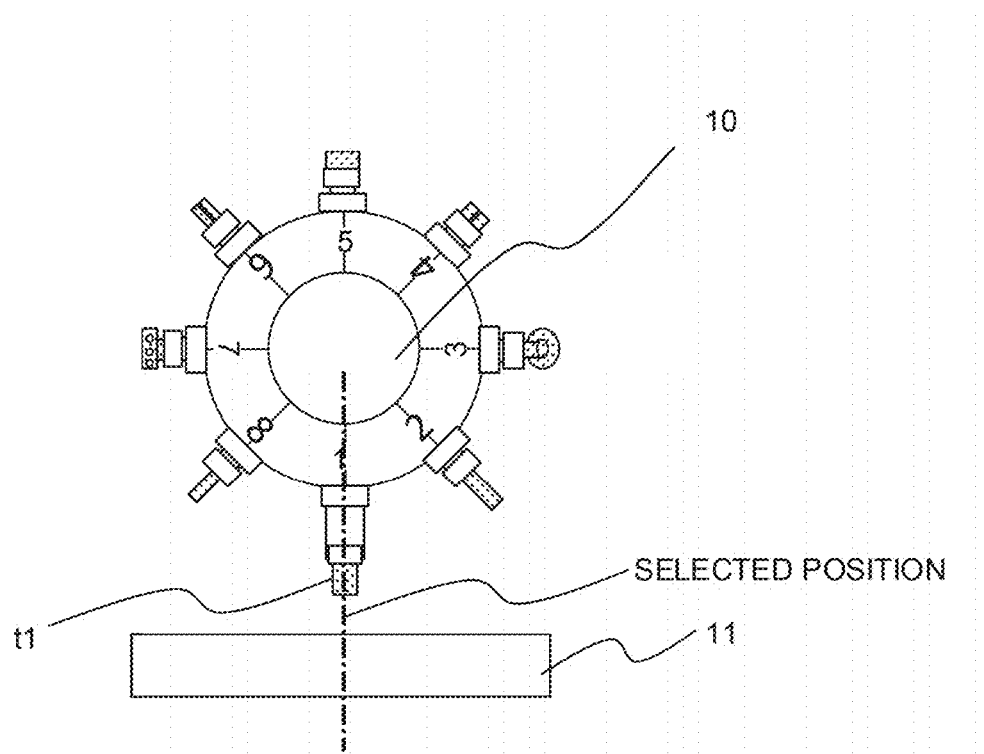
FIG. 1 is a view showing an example of a conventional turret.
Figure 2:
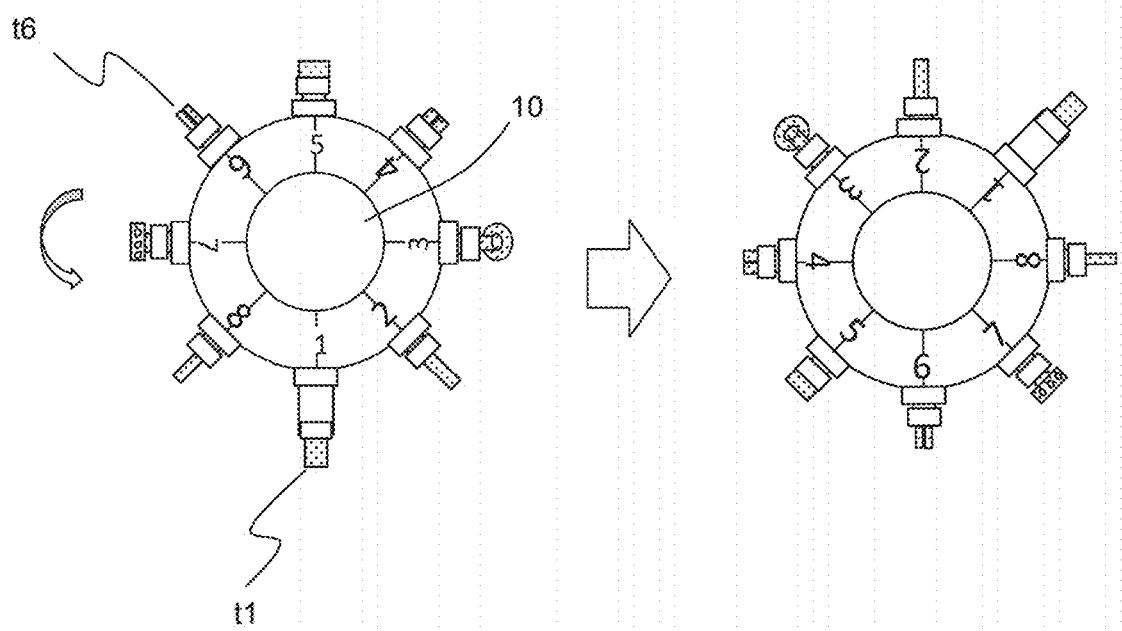
FIG. 2 is a view showing a typical turret motion.
Figure 3:
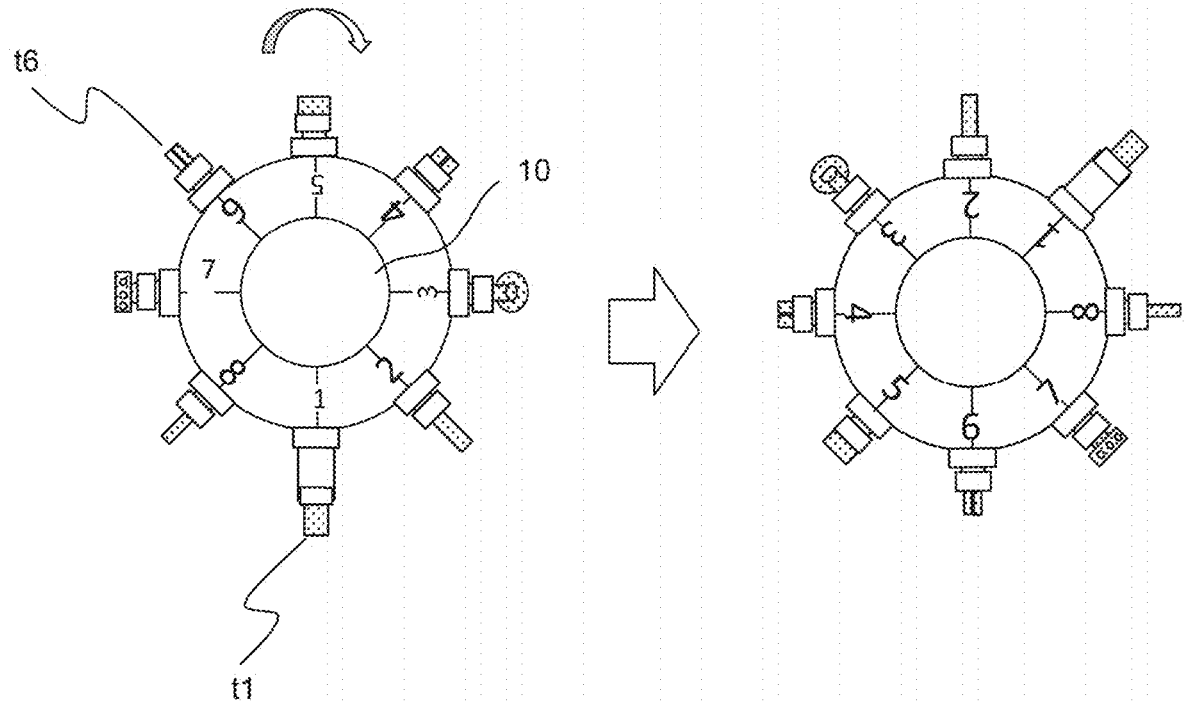
FIG. 3 is a view showing a typical turret motion.
Figure 4:
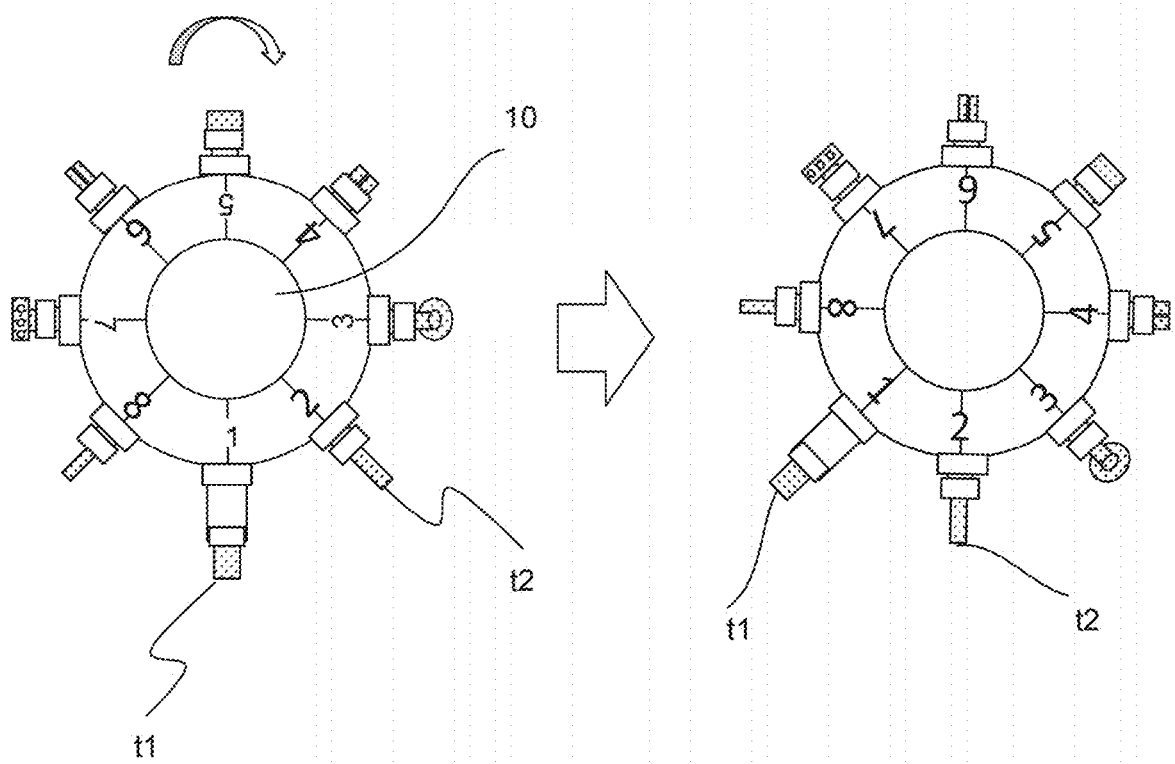
FIG. 4 is a view showing a typical turret motion.
Figure 5:
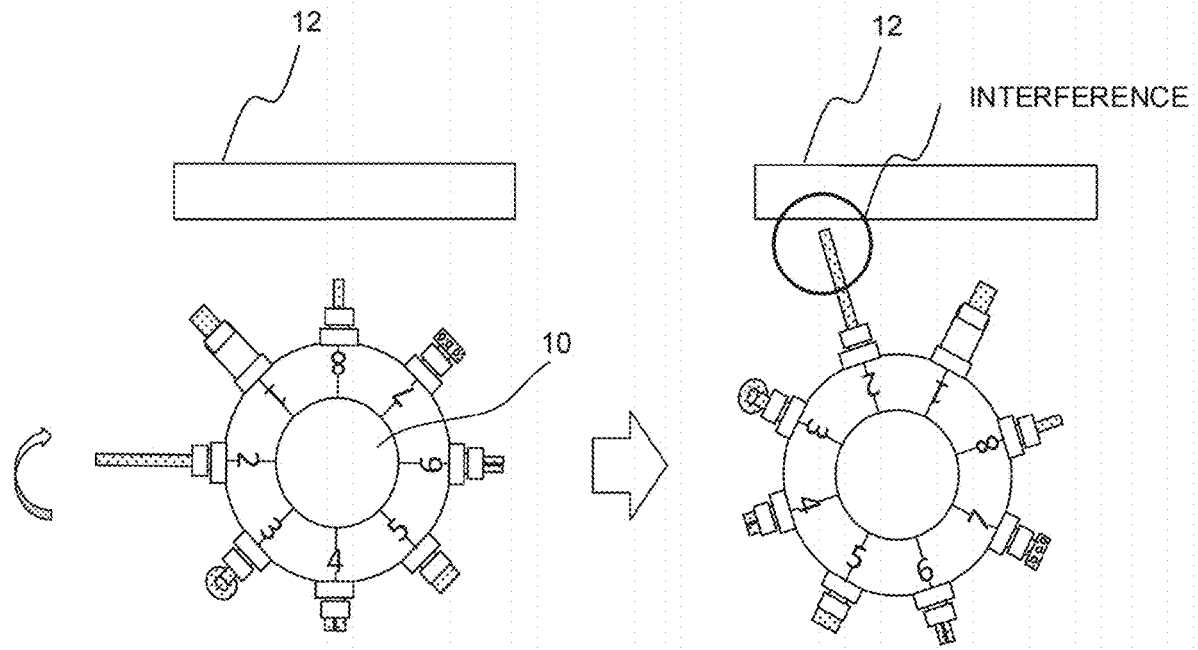
FIG. 5 is a view showing a problem of the conventional turret.
Figure 6:
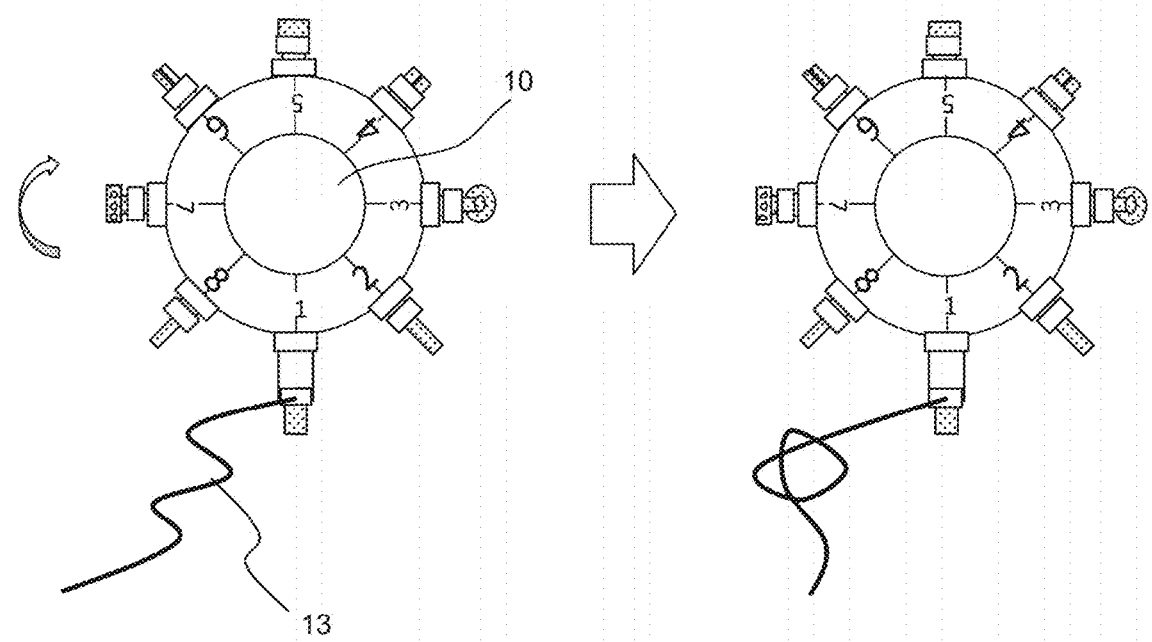
FIG. 6 is a view showing a problem of the conventional turret.
Figure 7:
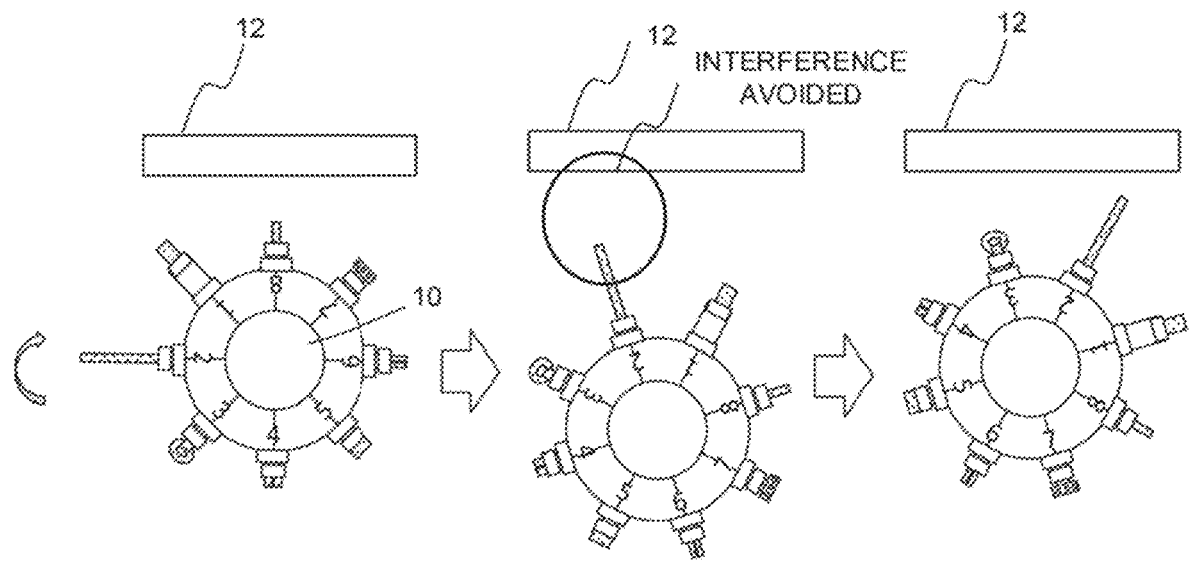
FIG. 7 is a view showing a prior art example.
Figure 8:
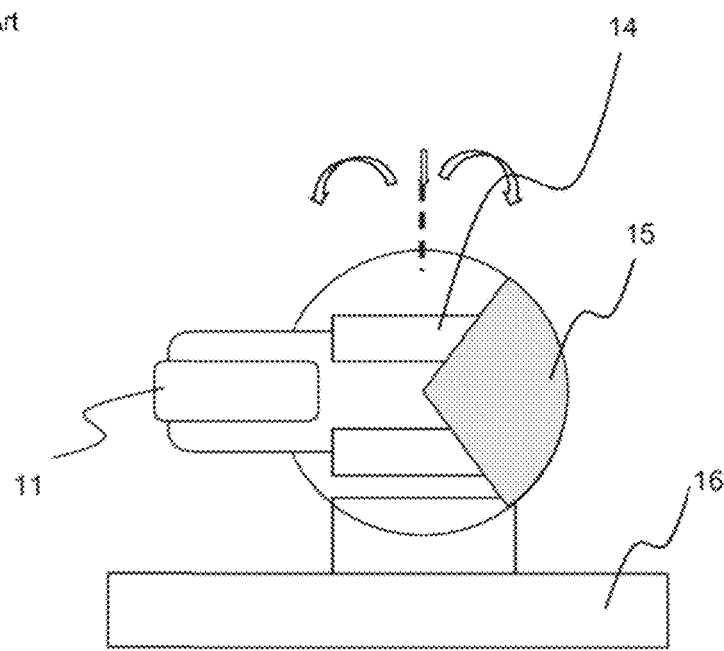
FIG. 8 is a view showing a prior art example.
Figure 9:
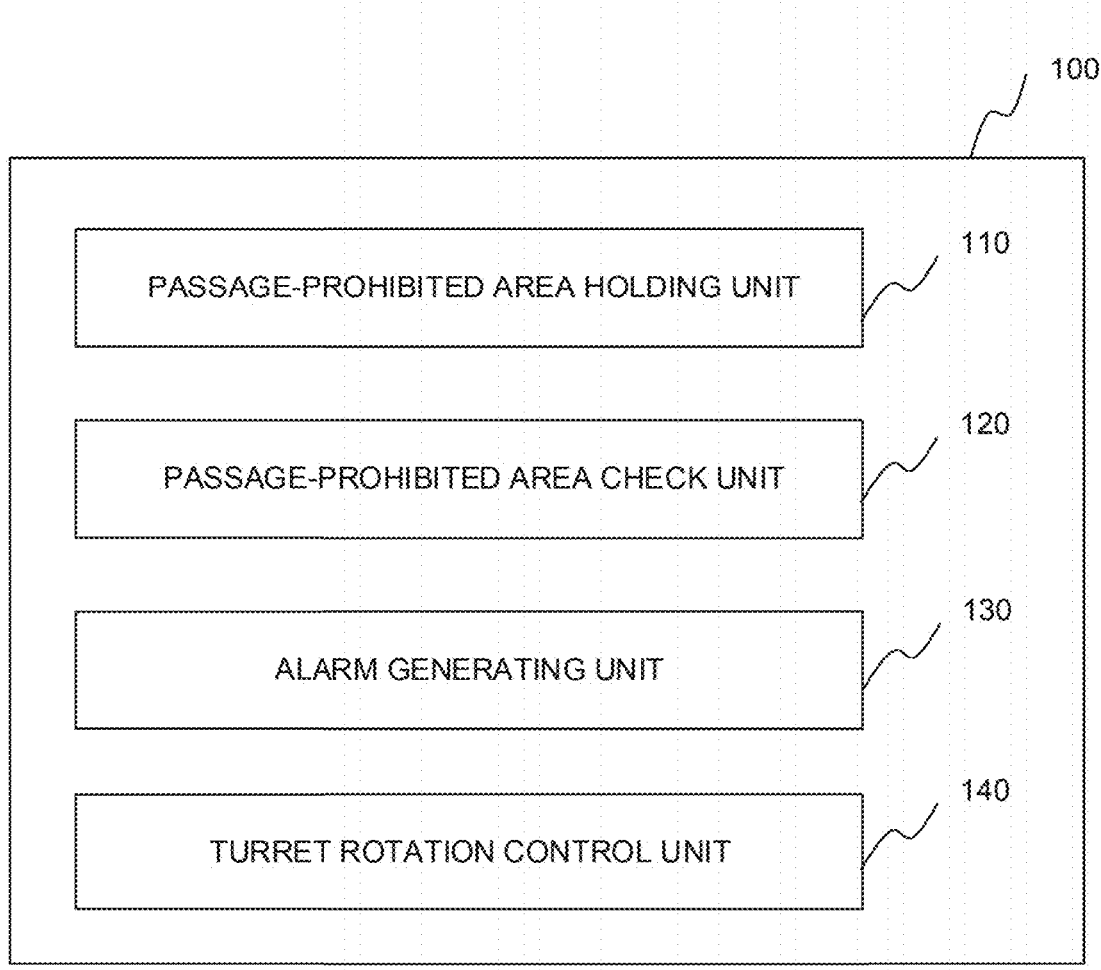
FIG. 9 is a block diagram showing the configuration of a numerical controller.

FIG. 9 is a block diagram showing the configuration of a numerical controller 100 according to an embodiment of the present invention.

The numerical controller 100 is characterized by comprising a passage-prohibited area holding unit 110, passage-prohibited area check unit 120, alarm generating unit 130, and turret rotation control unit 140. Other configurations are the same as those of a conventional numerical controller for turret control.

The numerical controller 100 is an information processor that typically comprises a central processing unit (CPU), storage device, and input/output device. The passage-prohibited area holding unit 110, passage-prohibited area check unit 120, alarm generating unit 130, and turret rotation control unit 140 are implemented as the CPU executes a predetermined program.

Figure 10:
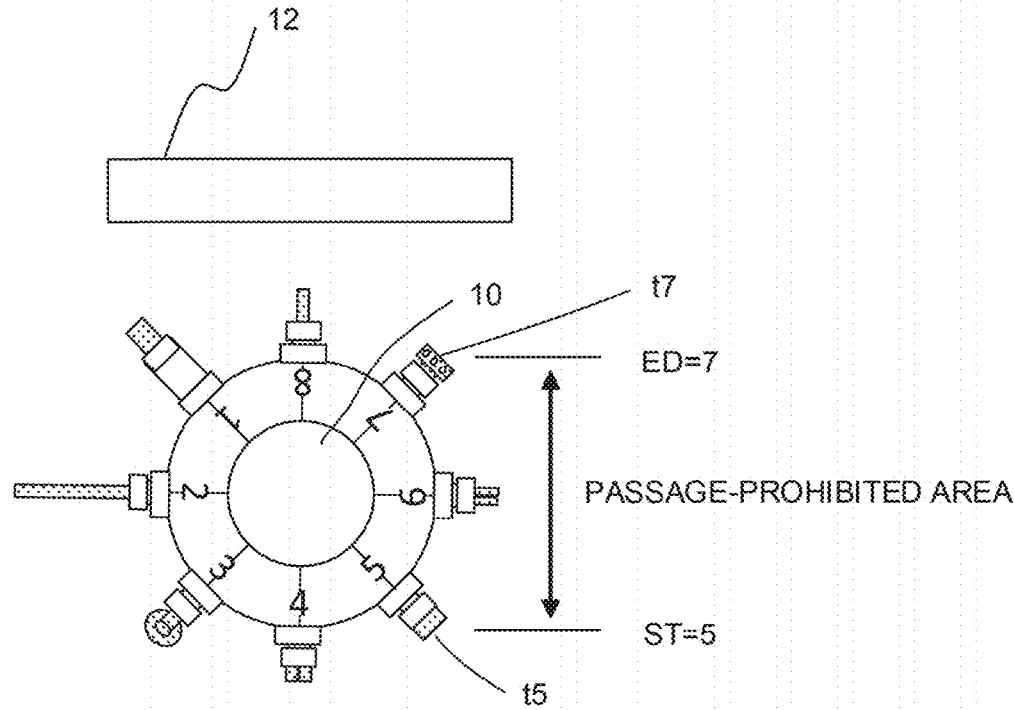
FIG. 10 is a view showing an example of a method for identifying a passage-prohibited area.

The passage-prohibited area holding unit 110 previously holds an area (hereinafter referred to as "passage-prohibited area") of a turret that prohibits the passage of a selected position. FIG. 10 shows an example of a method for identifying the passage-prohibited area.

In the example of FIG. 10, the passage-prohibited area is specified by specifying a passage-prohibited area starting tool number (hereinafter referred to as "ST") and a passage-prohibited area ending tool number (hereinafter referred to as "ED"). For example, if "ST=5" and "ED=7" are specified, the passage-prohibited area is an area shown in FIG. 10, that is, a region between No. 5 tool t5 and No. 7 tool t7. By this specification, the area (passage-prohibited area) between No. 5 and No. 7 tools t5 and t7 is disabled from passing through the selected position. The tools t5 and t7 themselves are not contained in the passage-prohibited area. That is, the tools t5 and t7 can stop at the selected position.

Figure 16:
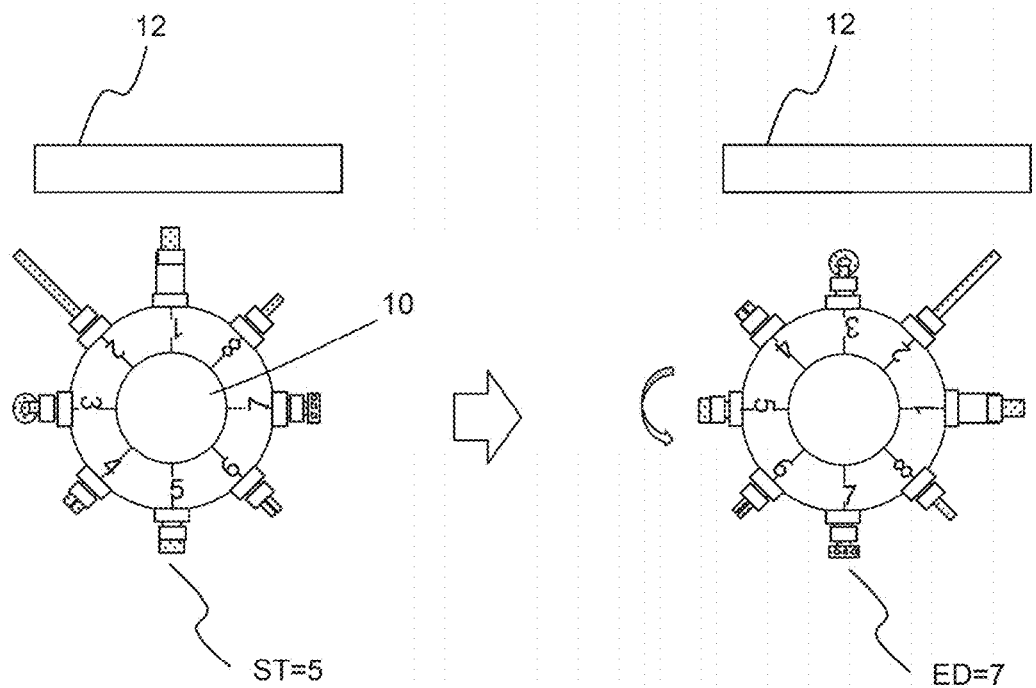
FIG. 16 is a view showing an example of a method for identifying the passage-prohibited area.
Figure 15A:
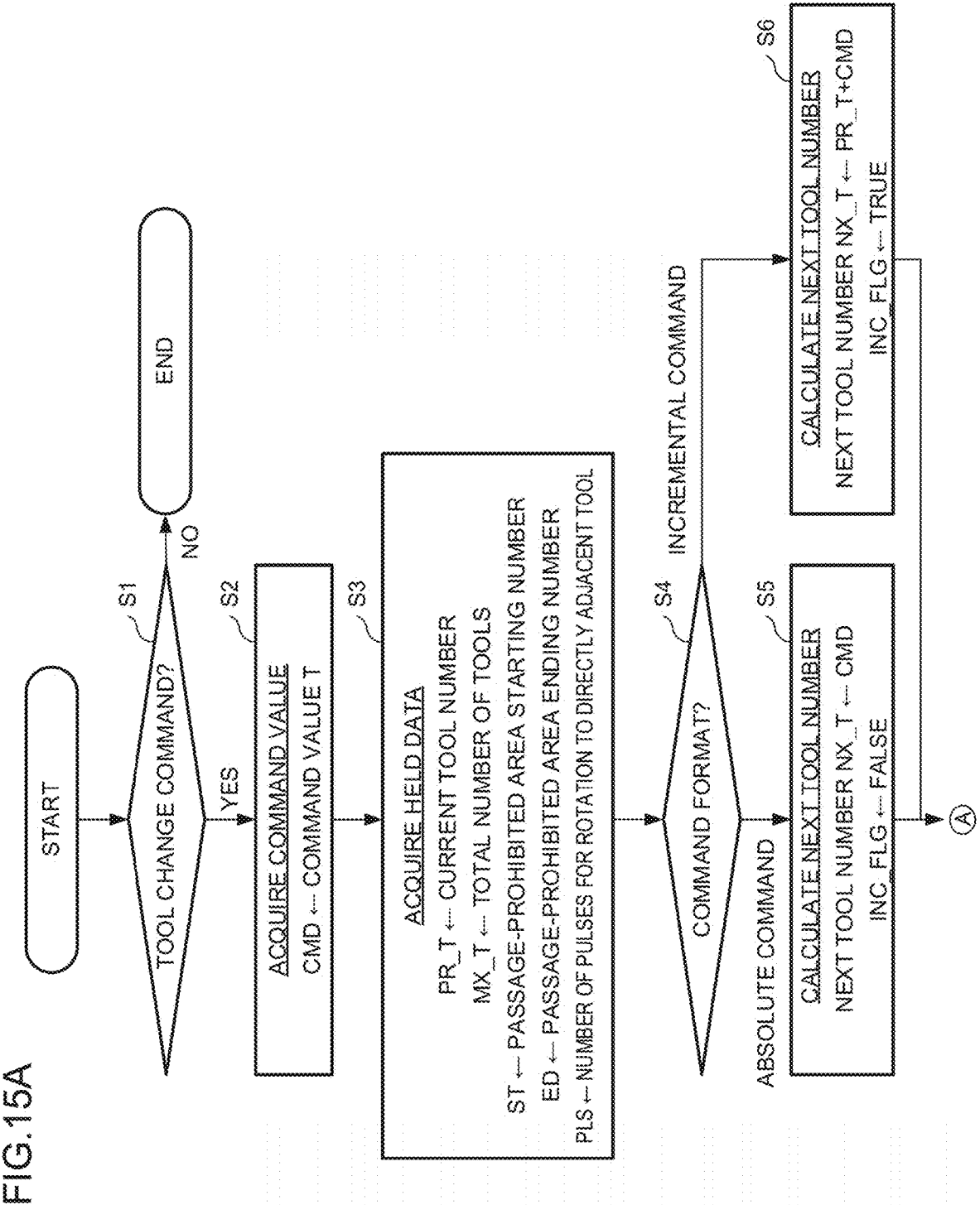
Figure 15B:
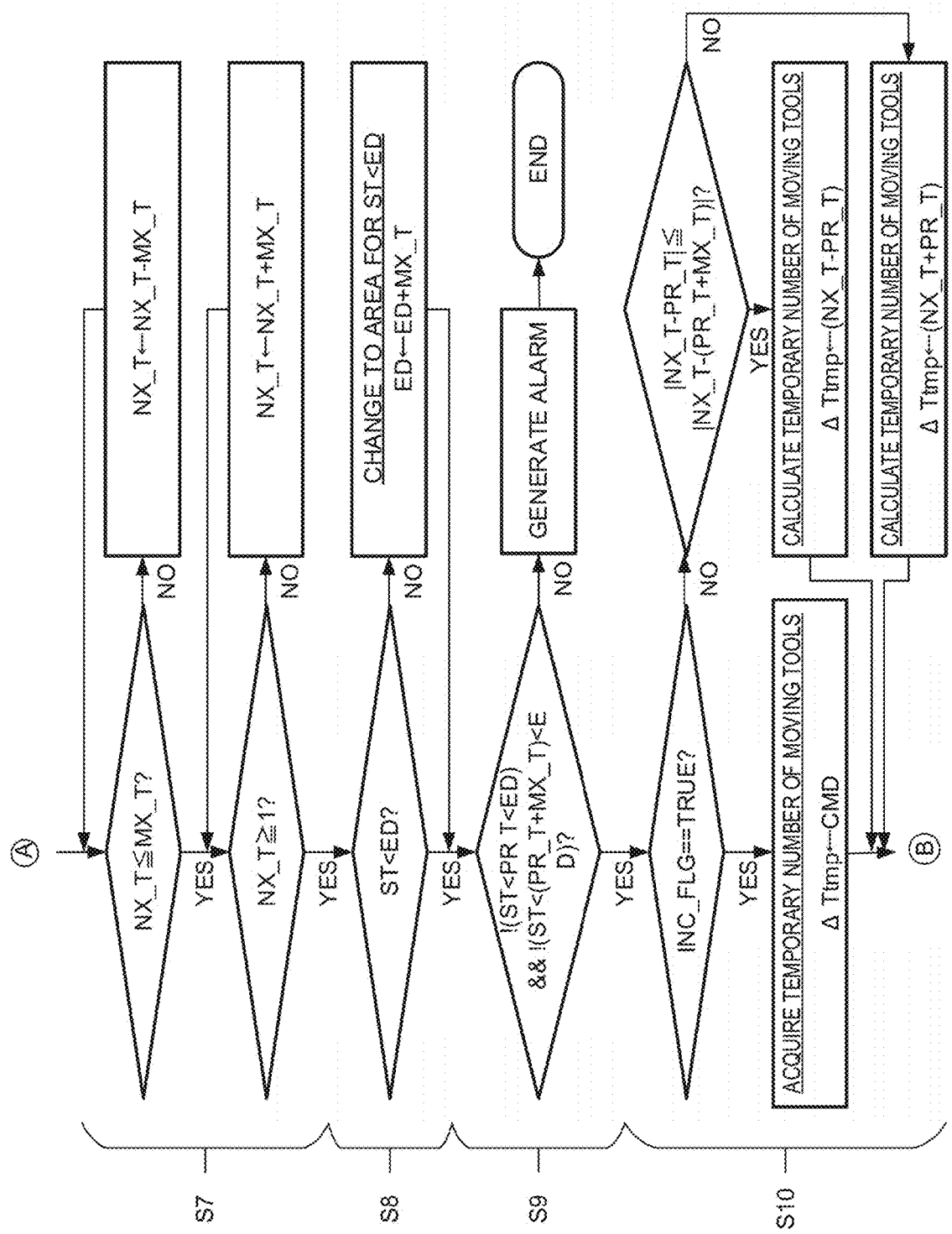
Figure 15C:
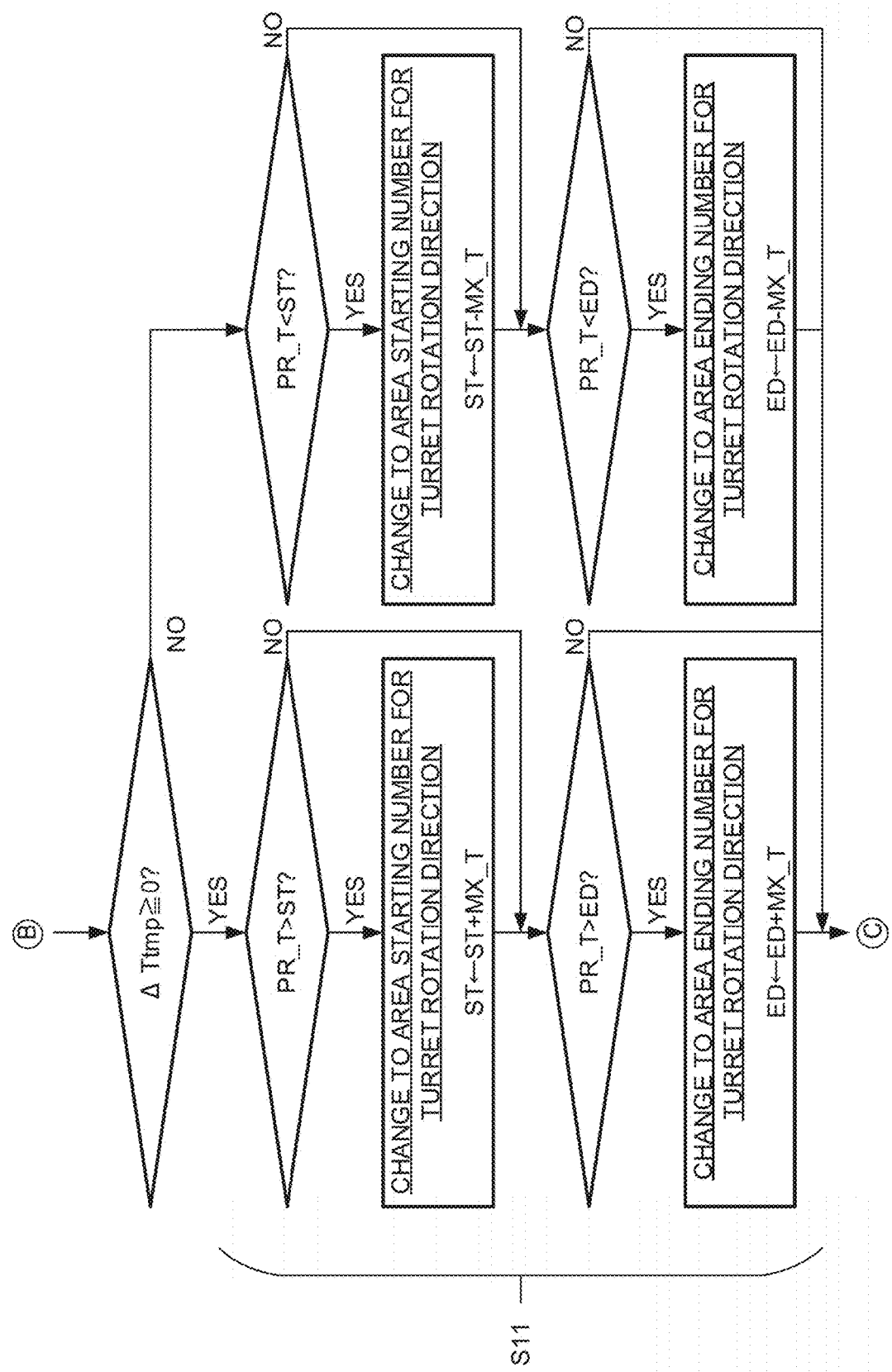
Figure 15E:
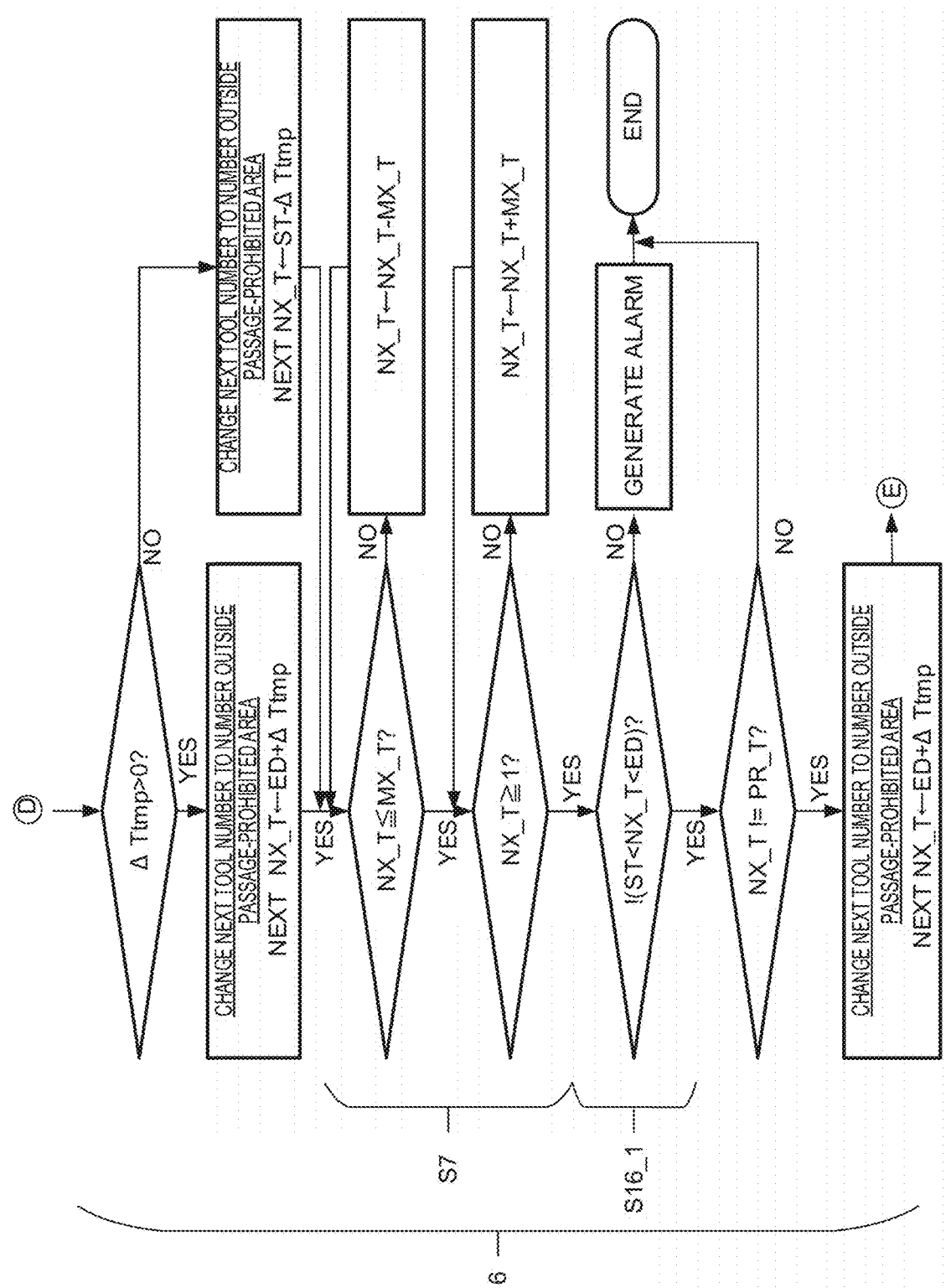

For example, the passage-prohibited area holding unit 110 comprises an input unit (not shown) and can accept the input of set values of ST and ED through key input or the like from the input unit. Alternatively, the passage-prohibited area holding unit 110 may have a passage-prohibited area setting mode, in which a user is urged to rotate a turret 10 so that the respective numbers of the tools stopped at the selected position are set as ST and ED, for example. More specifically, as shown in FIG. 16, the numbers ST and ED of the tools that define the passage-prohibited area can be determined by forwardly or reversely rotating the turret 10 to a position reached immediately before any of the tools interferes with a machine 12.

Figure 11:
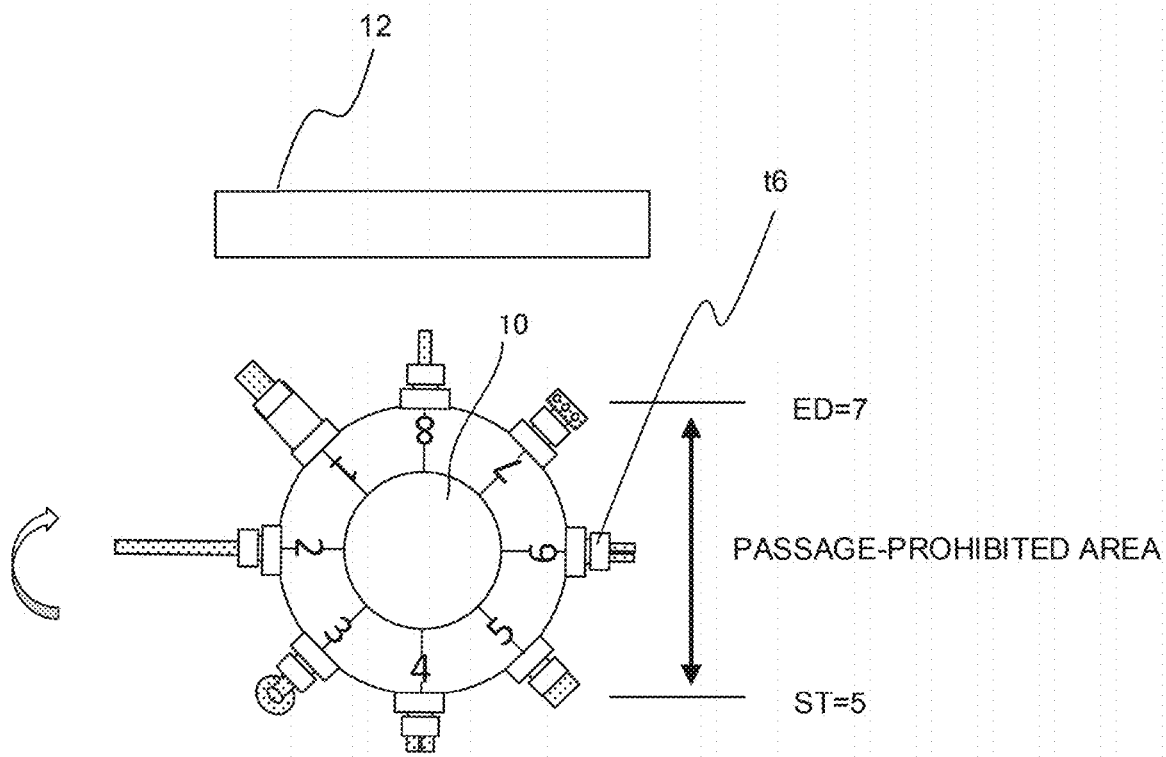
FIG. 11 is a view showing an example of the operation of a passage-prohibited area check unit.

The passage-prohibited area check unit 120 determines whether or not a tool number specified in response to a tool change command is present in the passage-prohibited area and whether or not the turret 10 passes through the passage-prohibited area as it rotates to select the specified tool. If the specified tool number (t6) is present in the passage-prohibited area, as shown in FIG. 11, the passage-prohibited area check unit 120 causes the alarm generating unit 130 to generate an alarm.

Figure 12:
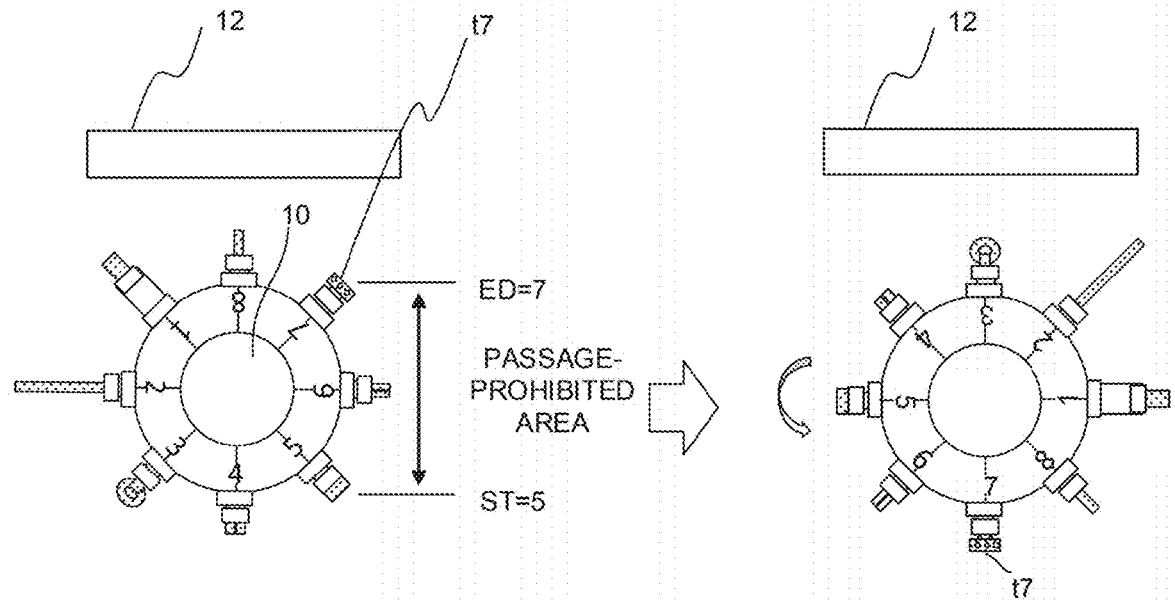
FIG. 12 is a view showing an example of the operation of the passage-prohibited area check unit.

Moreover, when the turret 10 is rotated by an absolute-command operation, incremental-command operation, or manual operation, the passage-prohibited area check unit 120 selects the specified tool (t7) by rotating the turret 10 reversely relative to the normal rotation, as shown in FIG. 12, if the passage-prohibited area inevitably passes over the selected position.

Figure 14:
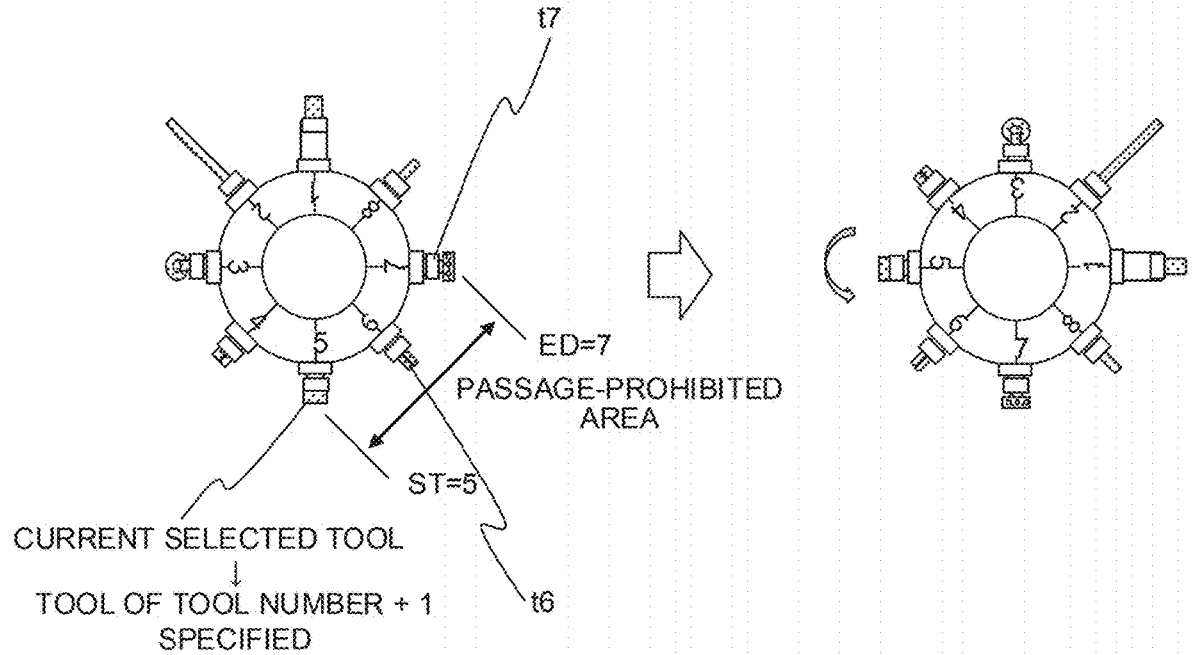
FIG. 14 is a view showing an example of the operation of the passage-prohibited area check unit.

Alternatively, as shown in FIG. 14, the passage-prohibited area check unit 120 may be configured to automatically select a tool number outside the passage-prohibited area instead of generating the alarm if the tool number is specified by the incremental-command or manual operation and if the specified tool (t6) is present in the passage-prohibited area. Also in this case, if the passage-prohibited area inevitably passes over the selected position when the turret 10 is rotated in the normal rotation direction, the target tool (t7) is selected by rotating the turret 10 reversely relative to the normal rotation.

The alarm generating unit 130 generates an alarm in response to a request from the passage-prohibited area check unit 120. The alarm can be generated by such a means as generation of a warning sound, lighting of a warning lamp, and display of a warning message.

The turret rotation control unit 140 performs control to rotate the turret 10 in accordance with the direction and amount of rotation required by the passage-prohibited area check unit 120. Typically, the rotation amount is specified by the number of numbers. Specifically, the turret rotation control unit 140 receives commands for forward rotation for two numbers and reverse rotation for three numbers, for example. Since the turret rotation control unit 140 previously holds the necessary pulse number for rotation for one number, the turret can be rotated according to the commands by generating a number of pulses obtained by multiplying the number of numbers commanded by the passage-prohibited area check unit 120 by the above-described pulse number.

The operation of the numerical controller 100 will be described further in detail with reference to the flowcharts of FIGS. 15A to 15E. The following is a sequential description of steps of processing.

Step S1: The numerical controller 100 receives a tool change command.

Step S2: The passage-prohibited area check unit 120 receives a command value T of the tool change command.

If the tool number is specified by an absolute command, it is delivered as the command value T to the passage-prohibited area check unit 120. For example, the command value T of a tool change command "M6T5" that specifies No. 5 tool is "5".

If the number of numbers is specified by an incremental command, in contrast, it is delivered as the command value T to the passage-prohibited area check unit 120. For example, the command value T of a tool change command "M6P5" is "5". In the case of the manual operation, "1" is delivered as the command value T to the passage-prohibited area check unit 120. The passage-prohibited area check unit 120 holds the command value T as CMD.

Step S3: The passage-prohibited area check unit 120 acquires the passage-prohibited area starting number ST and the passage-prohibited area ending number ED from the passage-prohibited area holding unit 110. Moreover, the passage-prohibited area check unit 120 acquires a currently selected tool number PR_T, total number of tools MX_T that the turret can hold, and necessary number of pulses PLS for the rotation of the turret to the directly adjacent tool number. PR_T, MX_T and PLS are assumed to be previously stored in a predetermined internal or external storage area of the passage-prohibited area check unit 120.

Step S4: The passage-prohibited area check unit 120 analyzes the tool change command. If the tool change command is the absolute command, the processing proceeds to Step S5. If the tool change command is the incremental command or the manual operation, the processing proceeds to Step S6.

Step S5: The passage-prohibited area check unit 120 sets the specified tool number CMD as a tool number NX_T to be selected next.

Step S6: The passage-prohibited area check unit 120 obtains the tool number NX_T to be selected next by adding the command value CMD to the current tool number PR_T.

Step S7: The passage-prohibited area check unit 120 normalizes NX_T so as to obtain "1≤NX_T≤MX_T".

Step S8: The passage-prohibited area check unit 120 normalizes ST and ED so as to obtain "ST<ED".

Step S9: The passage-prohibited area check unit 120 checks to see if the currently selected tool number is outside the prohibited area. If the current tool number is in the prohibited area, the alarm generating unit 130 is caused to generate an alarm, whereupon the processing ends.

Step S10: The passage-prohibited area check unit 120 calculates a temporary number of moving tools ΔTtmp. In the case of the incremental command, the passage-prohibited area check unit 120 sets ΔTtmp for the command number CMD. In the case of the absolute command, ΔTtmp is set for the number of moving tools in a shortcut direction from the current selected tool to the next selected tool.

Step S11: The passage-prohibited area check unit 120 changes the passage-prohibited area to a range adapted to the rotation direction of the turret.

Step S12: The passage-prohibited area check unit 120 determines whether or not the next selected tool NX_T is present in the passage-prohibited area. If the tool NX_T is in the passage-prohibited area and in the case of the absolute command, the alarm generating unit 130 is caused to generate an alarm, whereupon this processing end. If the tool NX_T is in the passage-prohibited area and in the case of the incremental-command or manual operation, in contrast, the processing proceeds to Step S16.

Step S13: The passage-prohibited area check unit 120 determines whether or not the next selected tool NX_T passes through the passage-prohibited area when it is caused to rotate the turret 10. If the passage-prohibited area is not passed, the number of moving tools ΔT is kept at ΔTtmp. If the passage-prohibited area is passed, the number of moving tools required to pass to reach the next selected tool NX_T by reverse rotation is calculated as ΔT.

Step S14: The passage-prohibited area check unit 120 updates the current tool number to PR_T+ΔT.

Step S15: The passage-prohibited area check unit 120 outputs ΔT×PLS as movement pulses OUTPUT for rotating the turret to the turret rotation control unit 140. Alternatively, the passage-prohibited area check unit 120 may output ΔT to the turret rotation control unit 140 so that OUTPUT can be calculated using PLS that is previously held by the turret rotation control unit 140. The turret rotation control unit 140 rotates the turret in response to OUTPUT.

Step S16: The passage-prohibited area check unit 120 performs processing for automatically changing the next selected tool number to a tool number outside the passage-prohibited area when the incremental command is given. In the present embodiment, if the changed tool number is also present in the passage-prohibited area, the alarm generating unit 130 is caused to generate an alarm, whereupon the processing ends (Step S16_1). Moreover, if the changed tool number is also present in the passage-prohibited area, the processing related to Step S16 may be re-executed so that the changed selected tool number gets out of the passage-prohibited area. In this case, a maximum recalculation frequency may be provided such that the re-execution frequency of the processing related to Step S16 is limited to the maximum recalculation frequency.

The following is a description of some examples of the operation of the numerical controller 100 according to the present embodiment.

Example 1

FIG. 11 shows an operation of the numerical controller 100 for the case in which the tool (t6) in the passage-prohibited area ("ST=5" and "ED=7") is specified as the next selected tool for the absolute-command, incremental-command, or manual operation. In this case, the passage-prohibited area check unit 120 causes the alarm generating unit 130 to generate an alarm.

Example 2

FIG. 12 shows an operation of the numerical controller 100 for the case in which the passage-prohibited area ("ST=5" and "ED=7") is inevitably passed if the next selected tool (t7) specified by the absolute command is selected by taking a shortcut. The same operation is performed if "3" is specified as the number of moving tools in the forward direction in response to the incremental command. In this case, the passage-prohibited area check unit 120 rotates the turret 10 reversely (counterclockwise in case of FIG. 12) relative to the normal rotation so as not to pass through the passage-prohibited position, thereby moving the next selected tool to the selected position.

Example 3

Figure 13:
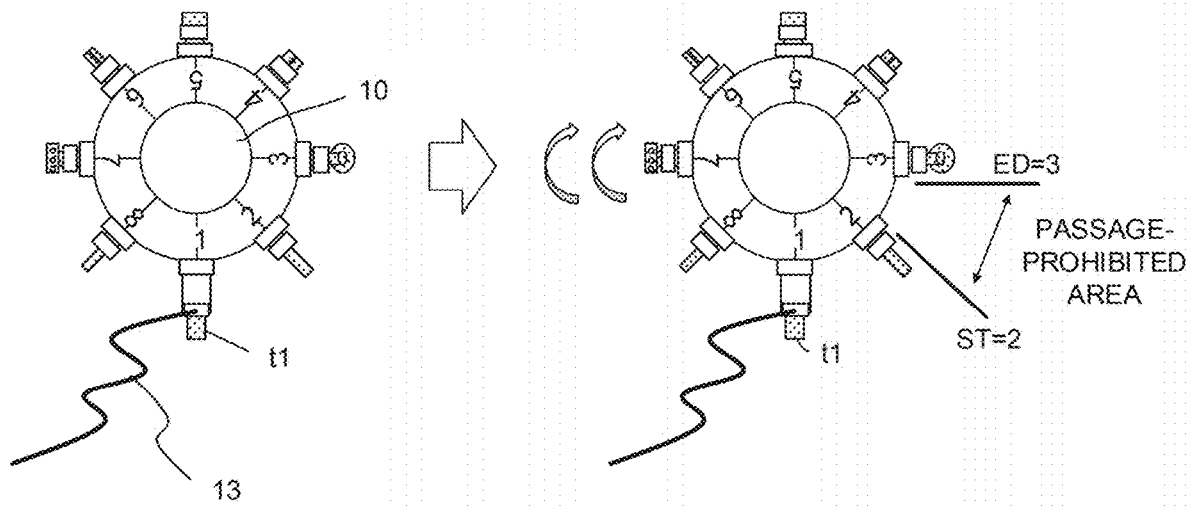
FIG. 13 is a view showing an example of the operation of the passage-prohibited area check unit.

FIG. 13 shows a setting example for preventing entanglement of a cable of a cable-connected tool.

An arbitrary narrow area ("ST=2" and "ED=3" in this example) is set as the passage-prohibited area in order to prevent the turret 10 from making more than one revolution. Preferably, the passage-prohibited area can be set in a position diagonal to a cable-connected tool t1. Thus, the passage-prohibited area check unit 120 suitably converts the command to reverse rotation even in case the turret makes a plurality of revolutions in the same direction in response to a plurality of consecutive commands (M6T2, . . . , M6T1, etc.), for example, so that the turret never makes more than one revolution.

According to the present embodiment, if the next selected tool is in the passage-prohibited area or if a route leading to the next selected tool passes through the passage-prohibited area, the passage-prohibited area check unit 120 performs control to generate an alarm, reverse the turret rotation direction, or automatically select a tool outside the passage-prohibited area. Thus, even in case there is neither a turret moving mechanism nor a management mechanism for position information (coordinate values) on the turret rotation axis, the tool change command can easily be incorporated into a machining program and the tool can be manually changed without being aware of the direction of the turret rotation at the time of tool change.

The present invention is not limited to the above-described embodiment and may be suitably changed without departing from the spirit of the invention. Any of the constituent elements of the embodiment may be modified or omitted without departing from the scope of the invention. While the turret according to the above-described embodiment is provided with the passage-prohibited area that is not allowed to pass over the selected position, for example, the same function can also be achieved by setting a passage-prohibited area that is allowed to pass over the selected position. In this case, the passage-prohibited area is set so as to contain the numbers of tools that interfere with the machine or the like, for example.

The invention claimed is:

1. A numerical controller configured to rotate, during a tool selection, a turret, which holds a plurality of tools on an outer peripheral portion thereof, thereby moving a selected one of the plurality of tools selected by a command to a selected position, the numerical controller comprising:
a processor configured to:
hold a partial area of the outer peripheral portion of the turret as a passage-prohibited area, the turret is prohibited from rotating in a rotational direction that results in the passage-prohibited area passing through the selected position;
prior to rotating the turret in the rotational direction to move the selected one of the plurality of tools to the selected position, determine whether or not the selected one of the plurality of tools is present in the passage-prohibited area and whether or not the passage-prohibited area passes through the selected position as the turret is rotated in the rotational direction to move the selected one of the plurality of tools to the selected position during the tool selection;
rotate the turret in the rotational direction to move the selected one of the plurality of tools to the selected position when it is determined that the selected one of the plurality of tools is not present in the passage-prohibited area and the passage-prohibited area does not pass through the selected position as the turret is rotated in the rotational direction to move the selected one of the plurality of tools to the selected position;
prohibit the turret from rotating in the rotational direction when it is determined that the selected one of the plurality of tools is present in the passage-prohibited area or when it is determined that the passage-prohibited area will pass through the selected position as the turret is rotated in the rotational direction; and
in response to prohibiting the turret from rotating in the rotational direction, rotate the turret in a rotational direction opposite the rotational direction to move the selected one of the plurality of tools to the selected position.

2. The numerical controller according to claim 1, wherein the selected one of the plurality of tools is specified by a tool number.

3. The numerical controller according to claim 1, wherein the selected one of the plurality of tools is specified by a number of tools to be moved.

4. The numerical controller according to claim 1, wherein the passage-prohibited area is identified by a tool number.

* * * * *